(12) United States Patent
Blicker

(10) Patent No.: US 8,442,497 B2
(45) Date of Patent: May 14, 2013

(54) METHOD FOR LINKING INTERNET-BASED FORUMS AND WEB LOGS TO A PUSH TO TALK PLATFORM

(76) Inventor: Stephan Blicker, Wachtberg-Villip (DE)

( * ) Notice: Subject to any disclaimer, the term of this patent is extended or adjusted under 35 U.S.C. 154(b) by 737 days.

(21) Appl. No.: 11/997,761

(22) PCT Filed: Aug. 3, 2006

(86) PCT No.: PCT/EP2006/007673
§ 371 (c)(1),
(2), (4) Date: Aug. 11, 2008

(87) PCT Pub. No.: WO2007/014777
PCT Pub. Date: Feb. 8, 2007

(65) Prior Publication Data
US 2008/0299952 A1    Dec. 4, 2008

(30) Foreign Application Priority Data

Aug. 4, 2005   (DE) .......................... 10 2005 037 315
Nov. 29, 2005  (DE) .......................... 10 2005 057 234

(51) Int. Cl.
*H04M 3/42* (2006.01)

(52) U.S. Cl.
USPC ............... 455/414.1; 455/414.2; 455/456.5; 370/259; 379/157

(58) Field of Classification Search ............... 455/414.1
See application file for complete search history.

(56) References Cited

U.S. PATENT DOCUMENTS

| | | | |
|---|---|---|---|
| 6,393,461 B1 * | 5/2002 | Okada et al. .................. | 709/204 |
| 6,430,602 B1 * | 8/2002 | Kay et al. ...................... | 709/206 |
| 6,484,196 B1 * | 11/2002 | Maurille ....................... | 709/206 |
| 6,512,986 B1 * | 1/2003 | Harmon ......................... | 702/84 |
| 6,525,747 B1 * | 2/2003 | Bezos ........................... | 715/751 |
| 6,741,990 B2 * | 5/2004 | Nair et al. ..................... | 1/1 |
| 6,745,238 B1 * | 6/2004 | Giljum et al. ................. | 709/219 |
| 6,754,470 B2 * | 6/2004 | Hendrickson et al. ...... | 455/67.11 |
| 6,763,226 B1 * | 7/2004 | McZeal, Jr. .................. | 455/90.2 |
| 6,791,582 B2 * | 9/2004 | Linsey et al. ................. | 715/751 |
| 6,804,653 B2 * | 10/2004 | Gabel ........................... | 704/270 |
| 6,807,458 B2 * | 10/2004 | Quackenbush et al. ....... | 700/213 |
| 6,856,928 B2 * | 2/2005 | Harmon ......................... | 702/84 |
| 7,043,232 B2 * | 5/2006 | Pelaez et al. ................. | 455/412.1 |
| 7,096,089 B2 * | 8/2006 | Quackenbush et al. ....... | 700/226 |
| 7,107,017 B2 * | 9/2006 | Koskelainen et al. ........ | 455/90.2 |
| 7,272,223 B2 * | 9/2007 | McCormack et al. ... | 379/265.09 |

(Continued)

FOREIGN PATENT DOCUMENTS

| | | |
|---|---|---|
| GB | 2 412 041 A | 9/2005 |
| WO | 00/47005 A1 | 8/2000 |
| WO | 2004/014050 A1 | 2/2004 |
| WO | 2004/086715 A1 | 10/2004 |

OTHER PUBLICATIONS

PCT International Search Report mailed Nov. 22, 2006.

*Primary Examiner* — Hai Nguyen
(74) *Attorney, Agent, or Firm* — Browdy and Neimark, PLLC

(57) ABSTRACT

The invention relates to a method for linking Internet-based forums and web logs to a push to talk platform, especially methods for adapting PoC to the environment of Internet forums by means of a novel PoClog storage platform and a novel interface from the PoC platform to the PoC log storage platform. Mobile clients have to support a new client functionality in order to request a log that is based on media messages.

12 Claims, 5 Drawing Sheets

U.S. PATENT DOCUMENTS

| | | | |
|---|---|---|---|
| 7,272,633 B2 * | 9/2007 | Malik et al. | 709/206 |
| 7,349,543 B2 * | 3/2008 | Simpson et al. | 380/270 |
| 7,403,768 B2 * | 7/2008 | Bedingfield et al. | 455/414.1 |
| 7,453,267 B2 * | 11/2008 | Westbrock et al. | 324/522 |
| 7,558,828 B1 * | 7/2009 | Panzer | 709/206 |
| 7,603,710 B2 * | 10/2009 | Harvey et al. | 726/23 |
| 7,620,413 B2 * | 11/2009 | Jen | 455/518 |
| 7,624,342 B2 * | 11/2009 | Matveyenko et al. | 715/255 |
| 7,706,817 B2 * | 4/2010 | Bamrah et al. | 455/466 |
| 7,735,108 B2 * | 6/2010 | FitzGerald | 725/106 |
| 7,778,606 B2 * | 8/2010 | Ammon et al. | 455/67.11 |
| 7,798,417 B2 * | 9/2010 | Snyder et al. | 235/494 |
| 7,853,250 B2 * | 12/2010 | Harvey et al. | 455/421 |
| 7,898,394 B2 * | 3/2011 | Hibbets | 707/707 |
| 7,966,319 B2 * | 6/2011 | Faus et al. | 707/723 |
| 8,005,494 B2 * | 8/2011 | Florkey et al. | 455/466 |
| 8,037,009 B2 * | 10/2011 | Hibbets | 706/62 |
| 8,040,803 B1 * | 10/2011 | Pawar et al. | 370/231 |
| 8,078,722 B2 * | 12/2011 | Harvey et al. | 709/224 |
| 8,122,506 B2 * | 2/2012 | Harvey et al. | 726/23 |
| 8,125,967 B1 * | 2/2012 | Talley et al. | 370/338 |
| 8,220,030 B2 * | 7/2012 | Singhal | 726/2 |
| 8,258,960 B2 * | 9/2012 | Bychkov et al. | 340/572.8 |
| 8,266,127 B2 * | 9/2012 | Mattox et al. | 707/705 |
| 8,284,773 B1 * | 10/2012 | Woleben et al. | 370/390 |
| 8,305,936 B2 * | 11/2012 | Wang | 370/254 |
| 2002/0039895 A1 * | 4/2002 | Ross et al. | 455/414 |
| 2003/0157960 A1 * | 8/2003 | Kennedy | 455/556 |
| 2003/0163519 A1 * | 8/2003 | Kegel et al. | 709/203 |
| 2003/0208545 A1 * | 11/2003 | Eaton et al. | 709/206 |
| 2003/0217289 A1 * | 11/2003 | Ammon et al. | 713/201 |
| 2004/0078424 A1 * | 4/2004 | Yairi et al. | 709/203 |
| 2004/0198392 A1 * | 10/2004 | Harvey et al. | 455/456.1 |
| 2004/0224710 A1 * | 11/2004 | Koskelainen et al. | 455/518 |
| 2004/0249949 A1 * | 12/2004 | Gourraud et al. | 709/227 |
| 2004/0252837 A1 * | 12/2004 | Harvey et al. | 380/270 |
| 2005/0041578 A1 * | 2/2005 | Huotari et al. | 370/229 |
| 2005/0136952 A1 | 6/2005 | Zabawskyj et al. | |
| 2005/0215273 A1 * | 9/2005 | Ito | 455/518 |
| 2005/0246416 A1 * | 11/2005 | Blomquist | 709/203 |
| 2005/0273489 A1 * | 12/2005 | Pecht et al. | 709/203 |
| 2005/0273503 A1 * | 12/2005 | Carr et al. | 709/219 |
| 2006/0004914 A1 * | 1/2006 | Kelly et al. | 709/219 |
| 2006/0047820 A1 * | 3/2006 | Sung et al. | 709/227 |
| 2006/0058008 A1 * | 3/2006 | Choksi | 455/406 |
| 2006/0063549 A1 * | 3/2006 | Choksi | 455/518 |
| 2006/0067502 A1 * | 3/2006 | Bamrah et al. | 379/211.02 |
| 2006/0088000 A1 * | 4/2006 | Hannu et al. | 370/328 |
| 2006/0184610 A1 * | 8/2006 | Izdepski et al. | 709/203 |
| 2006/0184611 A1 * | 8/2006 | Izdepski et al. | 709/203 |
| 2006/0184612 A1 * | 8/2006 | Izdepski et al. | 709/203 |
| 2006/0184629 A1 * | 8/2006 | Izdepski et al. | 709/206 |
| 2006/0184630 A1 * | 8/2006 | Izdepski et al. | 709/206 |
| 2006/0184631 A1 * | 8/2006 | Izdepski et al. | 709/206 |
| 2006/0184674 A1 * | 8/2006 | Izdepski et al. | 709/226 |
| 2006/0184678 A1 * | 8/2006 | Izdepski et al. | 709/229 |
| 2006/0184679 A1 * | 8/2006 | Izdepski et al. | 709/229 |
| 2006/0264209 A1 * | 11/2006 | Atkinson et al. | 455/422.1 |
| 2006/0270404 A1 * | 11/2006 | Tuohino et al. | 455/432.3 |
| 2006/0282408 A1 * | 12/2006 | Wisely et al. | 707/3 |
| 2006/0294189 A1 * | 12/2006 | Natarajan et al. | 709/206 |
| 2006/0294465 A1 * | 12/2006 | Ronen et al. | 715/706 |
| 2007/0100981 A1 * | 5/2007 | Adamczyk et al. | 709/223 |
| 2007/0117552 A1 * | 5/2007 | Gobburu et al. | 455/414.1 |
| 2007/0118657 A1 * | 5/2007 | Kreitzer et al. | 709/227 |
| 2007/0118853 A1 * | 5/2007 | Kreitzer et al. | 725/46 |
| 2007/0183354 A1 * | 8/2007 | Schuelke et al. | 370/312 |
| 2007/0214217 A1 * | 9/2007 | Ueno et al. | 709/204 |
| 2008/0017722 A1 * | 1/2008 | Snyder et al. | 235/494 |
| 2008/0021970 A1 * | 1/2008 | Werndorfer et al. | 709/206 |
| 2008/0233990 A1 * | 9/2008 | Jen | 455/518 |
| 2008/0275955 A1 * | 11/2008 | Yamazaki et al. | 709/205 |
| 2008/0299952 A1 * | 12/2008 | Blicker | 455/414.1 |
| 2009/0047915 A1 * | 2/2009 | Albertsson | 455/90.2 |
| 2009/0296598 A1 * | 12/2009 | Harvey et al. | 370/252 |
| 2009/0300763 A1 * | 12/2009 | Harvey et al. | 726/23 |
| 2009/0303909 A1 * | 12/2009 | Farhoudi et al. | 370/312 |
| 2010/0041365 A1 * | 2/2010 | Lott et al. | 455/406 |
| 2010/0056109 A1 * | 3/2010 | Wilson et al. | 455/412.1 |
| 2012/0110635 A1 * | 5/2012 | Harvey et al. | 726/1 |
| 2012/0134352 A1 * | 5/2012 | Vu | 370/347 |
| 2012/0309427 A1 * | 12/2012 | Harvey et al. | 455/456.5 |

* cited by examiner

METHOD FOR LINKING INTERNET-BASED FORUMS AND WEB LOGS TO A PUSH TO TALK PLATFORM

FIELD

The present invention relates to a method for linking Internet-based forums and weblogs to a Push-to-Talk (PoC) platform.

BACKGROUND

In today's Internet world, the number of weblogs is rapidly increasing. A weblog, often simply called "blog", is a website that periodically receives new entries. New entries appear at the top, older ones follow in reverse chronological order. Communities surface, assist each other in the Internet world, and use text messages, pictures, etc., in guestbooks and forums. It is therefore desirable to make these forums and weblogs accessible to the mobile world as well.

It is the object of the invention to present a method and a system for linking Internet-based forums and weblogs to a mobile communication system.

This object is met according to the invention with the characteristics of the independent claims, with reference being made here to the contents of the independent claims.

Preferred embodiments of the invention are defined in the dependent claims, with reference being made here to the contents of the dependent claims.

The inventive method for linking Internet-based forums and weblogs to a Push-to-Talk platform of a mobile communication system is characterized in that a novel PoC log storage platform and a novel interface to the existing Push-to-Talk platform is included. The Push-to-Talk platform communicates with the novel PoC log storage platform via the interface. The PoC log storage platform stores media data that was transmitted from the user equipment via the Push-to-Talk platform and makes it accessible to the Internet and to other mobile subscribers. Similarly as in web forums and weblogs, the media data is made accessible to the end user. In addition to that, the user equipment can itself also retrieve this data again via the Push-to-Talk platform. A novel client, for example in the form of a lean http client, is provided on the user equipment for this purpose.

Today's Internet-based web forums and weblogs are enjoying increasing popularity. This invention presents a way to utilize the Push-to-Talk system as a transport system to ensure a simple mobile link to web forums and weblogs. Additionally, not only text-based contributions, but voice/video contributions can be written and transmitted as well.

The PoC platform thus serves as an enabler service, i.e., use is made of PoC as an enabler for "PoC logs."

SUMMARY

The invention relates to methods for offering weblogs in the mobile field with the aid of Push-to-Talk as an enabler system. The methods contain the following services improvements:

Introduction of a novel intelligent guest-book-compatible and forum-compatible PoC log storage platform for Push-to-Talk for different types of media.

Introduction of novel interfaces on the PoC platform, to forward PoC messages to the PoC log storage platform.

Introduction of novel interface capabilities between user equipment and PoC server, to query and retrieve log information (nicknames, titles, MSISDNs) from the user equipment.

Introduction of novel interface capabilities between PoC server and Internet/third parties, to create guestbooks and/or forums, and to monitor, control and manage them.

Service Aspects

The mobile radio network operator who operates (hosts) a platform also offers PoC logs for his own purposes, as well as for third parties and end users.

The mobile radio network operator offers channels for third parties and end users to create and offer mobile-radio-specific logs of various media types.

The mobile radio network operator develops a platform for creating/offering, storing, querying and recovering logs that carry different types of media.

The mobile radio network operator offers PoC logs; the mobile radio network operator offers a PoC log interface to third parties; the mobile radio network operator offers PoC logs for direct Internet customers.

Business Opportunities for Mobile Radio Network Operators

The mobile radio network operator who operates (hosts) the platform, achieves the following benefits:

User friendliness of PoC (not only written logs, but voice logs are possible as well, simply by depressing a button) for mobile people.

A simple charging model by using an existing PoC charging model for end users, no additional fees for using the mobile radio network operator logs (integrated pricing), possibly additional fees for creating third-party logs and creating subscriber logs.

The number of communities on the Internet continues to grow, the use of weblogs continues to grow at a high rate, so why not utilize the potential for the mobile radio business.

The mobile radio network operator has, and supplies the PoC customer basis (attractive for third parties who offer mobile-radio-specific logs).

The mobile radio network operator supplies PoC infrastructure, additional investment only with respect to novel PoC log storage platform.

The mobile radio network operator can monitor, manage and control communication behavior, including that of third-party customer bases.

Circuit-switched (CS) and packet-switched (PS; if applicable) mobile-radio telephone calls/traffic may increase in the case that PoC logs offer the possibility to easily deposit MSISDNs, mail addresses, PoC addresses, etc., in the logs.

PS calls can easily be combined with general PoC infrastructure by using IMS (multiplier for introducing IMS).

People who did not know about it before and became aware of it through the use of POC logs, can initiate CS/PS calls to each other; potential for revenue growth, potential for increased ARPU, since communities help each other through phone calls.

Generating an increase in the mobile radio traffic, due to a participation and interaction of the communities of the fixed Internet world.

Uncoupling of communities who use the same PoC user equipment. This makes it possible to reach a broader spectrum of users due to the fact that PoC users can use PoC user equipment to communicate with a forum of users who do not necessarily need to have their own PoC-compatible, i.e., PoC-capable handset.

Technical Effect

Creation of a PoC log storage platform for creating, offering, storing, querying and recovering PoC logs.

Creation of a PoC protocol from the user equipment to the PoC log storage platform, to retrieve log information (content, names, MSISDNs, nicknames, time stamps, moods, etc.)

BRIEF DESCRIPTION OF THE DRAWINGS

An exemplary embodiment of the invention will be explained below with the aid of the drawings.

DETAILED DESCRIPTION

Figure 1:
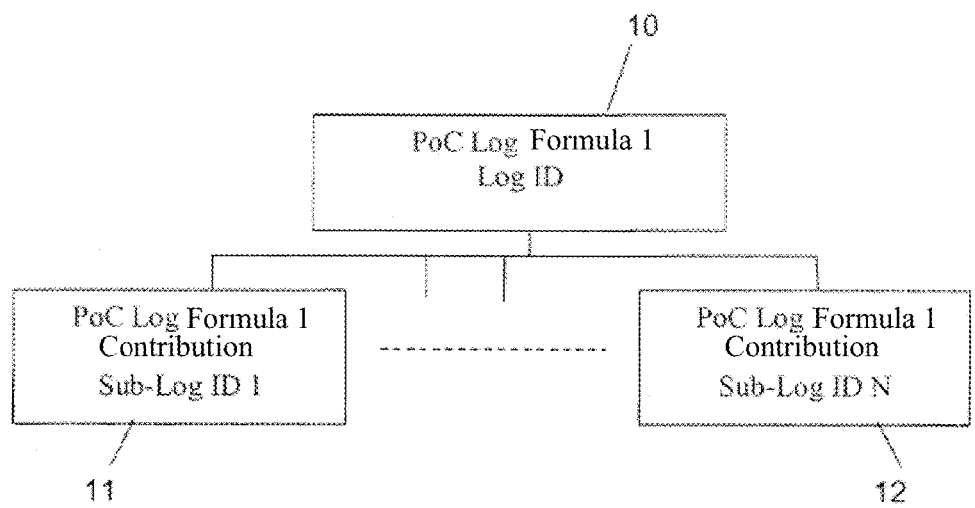
FIG. 1 shows a possible characterization and structure of PoC logs.

FIG. 1 shows the characterization and structure of PoC logs. Each log 10 has a unique identifier, for example in the form of a Log ID. The identifier is generated when the PoC log is created. The identifier may contain log-specific and provider-specific information. Each contribution 11, 12 to a PoC log 10 has a unique sub-identifier, Sub Log ID, and may contain information about the supplier of the message, (e.g., MSISDN, e-mail, PoC-group addresses, etc.) The PoC log 10 may contain different types of media (voice, text, images . . . ), depending on the user equipment settings and on the options that are available to the supplier of the message.

Figure 2:
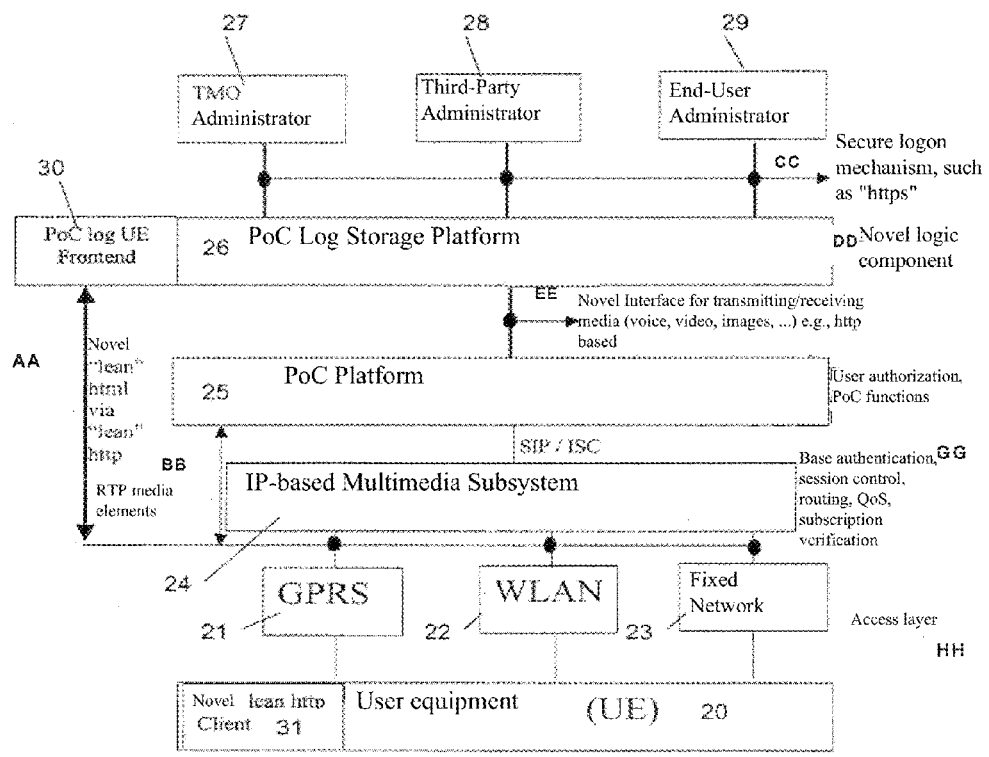
FIG. 2 shows the general architecture of the PoC log service.

The general architecture is shown in FIG. 2. User equipment 20 is given access, in a known manner, via available access networks, such as GPRS 21, WLAN 22, fixed network 23, to an IP multimedia subsystem (IMS) 24. The IMS 24 is responsible for authenticating the user equipment 20, for the session control, for the routing, as well as for the quality control (QoS) and subscription verification. The access networks 21, 22, 23, are additionally connected to a Push-to-Talk over Cellular (PoC) platform 25, which makes corresponding PoC services available to the users and which performs a user authorization for the PoC services. The IMS 24 is connected via an SIP/ISC interface to the PoC platform 25.

The architecture of the service is characterized by a novel PoC log storage platform 26, which is connected via an interface to the PoC platform 25. Via this interface, log media are transmitted between the PoC log storage platform 26 and the PoC platform 25. The PoC log storage platform 26 additionally offers interfaces 27, 28, 29 for the administration, creation and deletion of logs. The interfaces 27, 28, 29 could be used by the mobile radio network operator through third-party administrators or even by subscribers. All user types can create new logs and delete and administer them. The logs contain subscriber-specific information and access rights for the subscriber and a reference to the logs. The PoC log storage platform 26 additionally contains a so-called lean front end 30 for the user equipment 20, to retrieve logs, log information, and the ability to select a log or media from logs via the user equipment. The PoC client that is implemented on the user equipment is therefore able to interact with a log lean HTTP client 31, which is likewise provided on the user equipment. The user equipment 20 is therefore also slightly impacted when it supports the PoC log service.

Example Applications

All of the example applications will be based on the assumption that logs on the PoC log storage platform 26 were previously created with the aid of the user interfaces 27, 28, 29 by the mobile radio network operator, by the third parties, or by the end users, with the aid of well-known protocol mechanisms, such as http (user name and password). The most important novel service scenarios can therefore be characterized by the sending of log contributions via PoC, recovering of the of log information via PoC and querying log information and query logs (search logs and sublogs before logs are sent/recovered).

Figure 3:
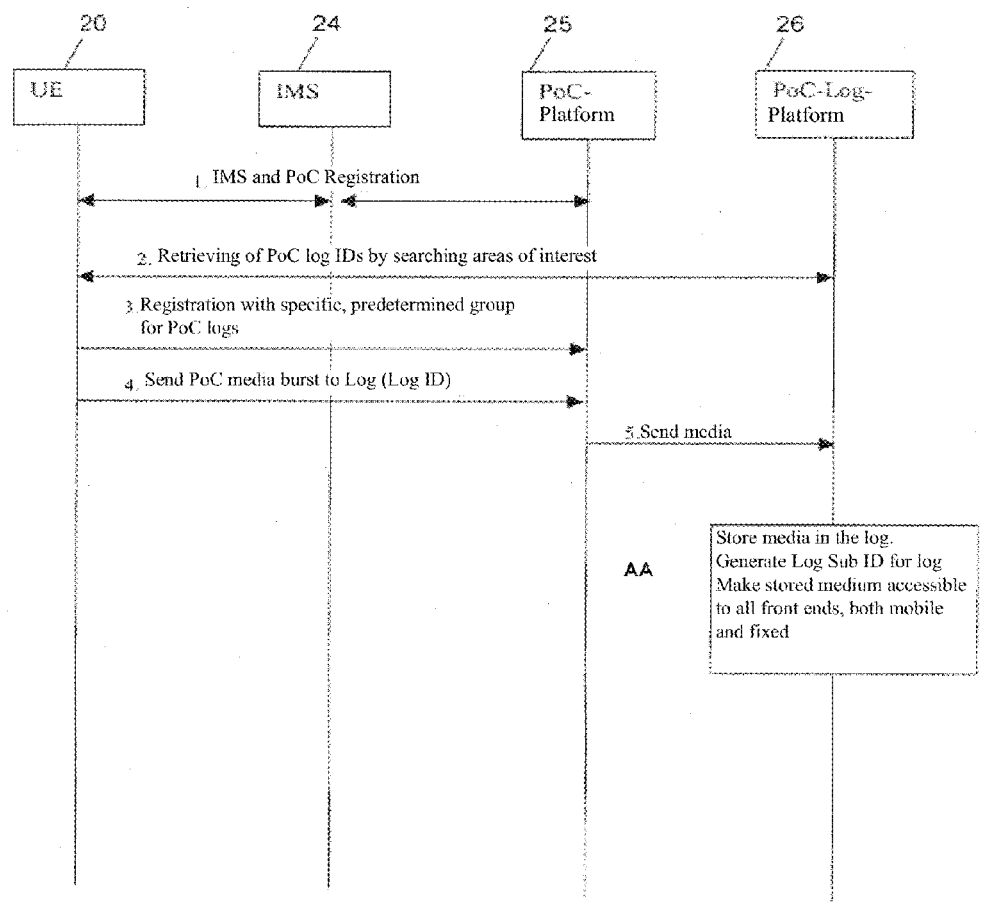
FIG. 3 shows the process of sending a contribution to logs with the use of PoC and IMS.

FIG. 3 shows the sending of a contribution to logs with the use of PoC and IMS. In the first step, an IMS and PoC registration of the user equipment 20 takes place with the IMS 24 and with the PoC platform 25. In the second step, a retrieving of PoC logs IDs takes place in the PoC log storage platform 26 by searching areas of interest. In a third step, the user is able to register with the aid of his user equipment 20 with the PoC platform 25, with a specific, pre-determined PoC group for PoC logs. In a fourth and fifth step, PoC media can be sent from the user equipment by means of data bursts to the PoC log storage platform 26 and to the log, identified by the Log ID. The media are stored in the log and a Sub Log ID is generated for the corresponding contribution. The stored medium can now be retrieved under the Sub Log ID by all front ends, both mobile and fixed.

Figure 4:
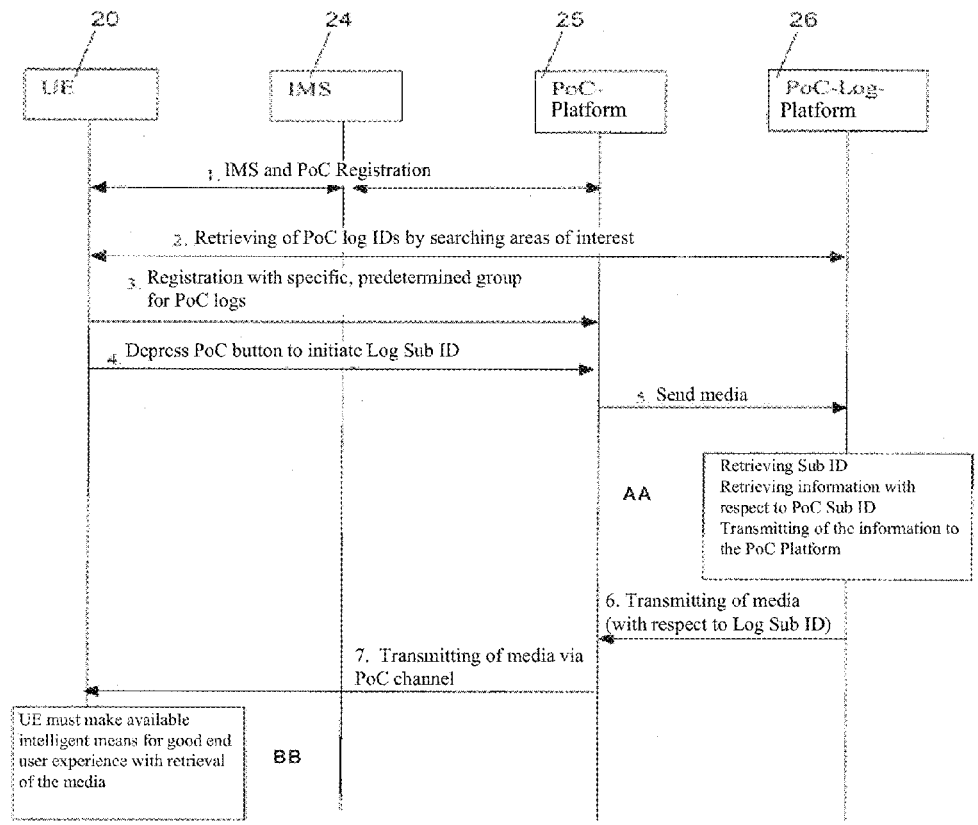
FIG. 4 shows a process of retrieving contributions from logs with the use of PoC and IMS.

FIG. 4 shows a process of retrieving contributions from logs with the use of PoC and IMS. In the first step, an IMS and PoC registration of the user equipment 20 takes place with the IMS 24 and with the PoC platform 25. In the second step, a retrieving of PoC logs IDs takes place in the PoC log storage platform 26 by searching areas of interest. In a third step, the user is able to register with the aid of his user equipment 20 with the PoC platform 25, with a specific, pre-determined PoC group for PoC logs. In a fourth step, the user can initiate a query of a log via the Log Sub ID by depressing a PoC button on his user equipment 20. This message is transmitted in a fifth step from the PoC platform 25 to the PoC log storage platform 26. At the PoC log storage platform 26, information belonging to the Log Sub ID, e.g., contributions and media, are then retrieved and transmitted in the sixth step to the PoC platform 25. In a seventh step, a transmission of the information then takes place via a PoC channel from the PoC platform 25 to the user equipment 20. The user equipment 20 makes intelligent means available for calling up the media.

Figure 5:
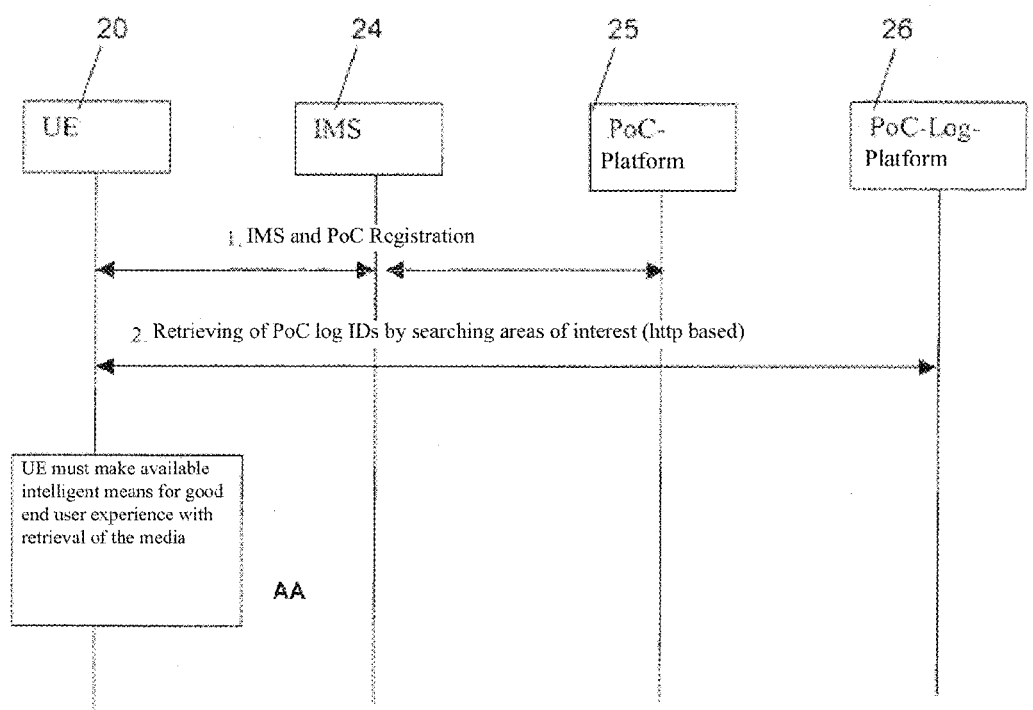
FIG. 5 shows a process of retrieving a log by searching areas of interest.

FIG. 5 shows a process of retrieving a log by searching areas of interest. In a first step, an IMS and PoC registration of the user equipment 20 takes place with the IMS 24 and with the PoC platform 25. In the second step, a direct retrieving of PoC logs IDs takes place in the PoC log storage platform 26 by searching of areas of interest. The user equipment 20 makes intelligent means available for this purpose for calling up the media.

Prospects

The PoC log storage platform 26 provides the possibility to create, send, retrieve and query log information. In the future, it could additionally also be possible to take the user address from the log-ID information and immediately start a call via IMS to the log participant. With this type of service, the services-interaction scenarios could grow quickly, and IMS will be the solution in the mobile radio network.

What is claimed is:

1. A method for linking Internet-based forums and weblogs to a mobile communication system, comprising the steps of:
    connecting a user equipment (20) via at least one access network to an IP multimedia subsystem (IMS) (24), said IMS being configured for authenticating the user equipment (20), controlling a session, routing control, quality control and subscription verification,
    connecting the at least one access network to a Push-to-Talk over Cellular (PoC) platform (25) for making corresponding PoC services available to the user equipment and performs a user authorization for the PoC services,
    connecting the IMS (24) via an SIP/ISC interface to the PoC platform (25),
    connecting a PoC log storage platform (26) via an interface to the PoC platform (25) wherein the interface is configured to transmit log media between the PoC log storage platform (26) and the PoC platform (25),
    using the PoC platform (25) as a transport system for transmitting and receiving weblogs to link the user equipment (20) to web forums and weblogs by storing, via the PoC log storage platform (26), log media in PoC logs (10), which are transmitted from user equipment (20) via the PoC platform (25) to the PoC log storage platform (26) and vice versa, and making said PoC logs (10) accessible for the Internet and for other mobile subscribers, and
    assigning each PoC log (10) a unique identifier when the PoC log (10) is created, and
    wherein the unique identifier contains log-specific and provider-specific information,
    wherein each contribution (11, 12) to a PoC log (10) has a unique sub-identifier and each contribution (10, 11) contains information about the supplier of the message.

2. The method according to claim 1, wherein the log media stored in the PoC logs (10) is made accessible for the user equipment (20).

3. The method according to claim 1, wherein the log media is retrieved from the PoC logs (10) by the user equipment (20) via the PoC platform (25).

4. The method according to claim 1, wherein both, text-based contributions as well as voice/video contributions are transmitted in the log media.

5. The method according to claim 1, further comprising sending log media to at least one of the PoC logs (10) via the PoC platform (25) and the IMS (24).

6. The method according to claim 5, wherein the step of sending log media to at least one of the PoC logs (10) comprises:
    registering the user equipment (20) that is sending the log media with the IMS (24) and the PoC platform (25);
    retrieving at least one PoC log unique identifier stored in the PoC log storage platform (26) by searching areas of interest;
    registering a user via the user equipment with a specific, pre-determined PoC group for PoC logs in the PoC platform (25);
    sending log media from the user equipment via data bursts to the PoC log identified by the at least one PoC log unique identifier stored in the PoC log storage platform (26);
    storing the sent log media in the PoC log identified by the at least one PoC log unique identifier; and
    generating a sub-log identifier for the stored log media.

7. The method according to claim 5, wherein the step of retrieving log media to at least one of the PoC logs (10) comprises:
    registering the user equipment (20) that is retrieving the log media with the IMS (24) and the PoC platform (25);
    retrieving at least one PoC log unique identifier stored in the PoC log storage platform (26) by searching areas of interest;
    registering a user via the user equipment with a specific, pre-determined PoC group for PoC logs in the PoC platform (25);
    transmitting a query, via at least one log sub-identifier, of the stored PoC logs in the PoC storage platform (26), received by detecting depression of a PoC button on the user equipment (20);
    at the PoC log storage platform (26), retrieving log media stored in the PoC logs identified by the at least one log sub-identifier;
    transmitting the retrieved log media from the PoC log storage platform (26) to the PoC platform (25); and
    transmitting the retrieved log media from the PoC platform (25) to the user equipment that sent the query.

8. The method according to claim 5, wherein the step of retrieving log media to at least one of the PoC logs (10) comprises:
    registering the user equipment (20) that is retrieving the log media with the IMS (24) and the PoC platform (25); and
    directly retrieving at least one PoC log unique identifier from the PoC storage platform (26) by searching areas of interest using the user equipment; and
    retrieving the log media stored in the PoC log corresponding to the retrieved at least one PoC log unique identifier.

9. The method according to claim 1, further comprising retrieving log media from at least one of the PoC logs (10) via the PoC platform (25) and the IMS (24).

10. A method for linking Internet-based forums and weblogs to a mobile communication system, comprising the steps of:
    connecting a user equipment (20) via at least one access network to an IP multimedia subsystem (IMS) (24), said IMS being configured for authenticating the user equipment (20), controlling a session, routing control, quality control and subscription verification,
    connecting the at least one access network to a Push-to-Talk over Cellular (PoC) platform (25) for making corresponding PoC services available to the user equipment and performs a user authorization for the PoC services,
    connecting the IMS (24) via an SIP/ISC interface to the PoC platform (25),
    connecting a PoC log storage platform (26) via an interface to the PoC platform (25) wherein the interface is configured to transmitting log media between the PoC log storage platform (26) and the PoC platform (25),
    using the PoC platform (25) as a transport system for transmitting and receiving weblogs to link the user equipment (20) to web forums and weblogs by storing, via the PoC log storage platform (26), log media in PoC logs (10), which are transmitted from user equipment (20) via the PoC platform (25) to the PoC log storage platform (26) and vice versa, assigning each PoC log a unique identifier when the PoC log is created, and making said PoC logs (10) accessible for the Internet and for other mobile subscribers; and
    implementing a lean http client (31) on the user equipment (20) for interacting with a lean front end (30) on the PoC log storage platform (26) for retrieving the log media from the PoC logs (10) stored in the PoC platform, and
    wherein the unique identifier contains log-specific and provider-specific information, wherein each contribution (11, 12) to a PoC log (10) has a unique sub-identifier and each contribution (10, 11) contains information about the supplier of the message.

11. A system and configuration for linking Internet-based forums and weblogs to a mobile communication system, comprising
- a user equipment (20) connected via at least one access network to an IP multimedia subsystem (IMS) (24) said IMS being configured for authenticating the user equipment (20), controlling a session, routing control, quality control and subscription verification,
- a Push-to-Talk over Cellular (PoC) platform (25) connected to the at least one access network for making corresponding PoC services available to the user equipment and performs a user authorization for the PoC services and via an SIP/ISC interface to the IMS (24),
- a PoC log storage platform (26) connected via an interface to the PoC platform (25), wherein the interface is configured to transmitting log media between the PoC log storage platform (26) and the PoC platform (25),
- wherein the PoC platform (25) constitutes a transport system for transmitting and receiving weblogs to link the user equipment (20) to web forums and weblogs by storing, via the PoC log storage platform (26), log media in PoC logs (10), which are transmitted from user equipment (20) via the PoC platform (25) to the PoC log storage platform (26) and vice versa, making said PoC logs (10) accessible for the Internet and for other mobile subscribers,
- wherein each PoC log (10) is identified by a unique identifier that is assigned to that PoC log (10) when that PoC log (10) is created, and
- wherein the unique identifier contains log-specific and provider-specific information,
- wherein each contribution (11, 12) to a PoC log (10) has a unique sub-identifier and each contribution (10, 11) contains information about the supplier of the message.

12. A system and configuration according to claim 11, wherein the PoC log (10) contains various contributions comprising different types of media, including voice, text, images.

* * * * *